Feb. 6, 1962 P. EMILE, JR 3,020,418
TRANSISTORIZED STORAGE REGISTER-INDICATOR CIRCUIT
Filed May 23, 1958
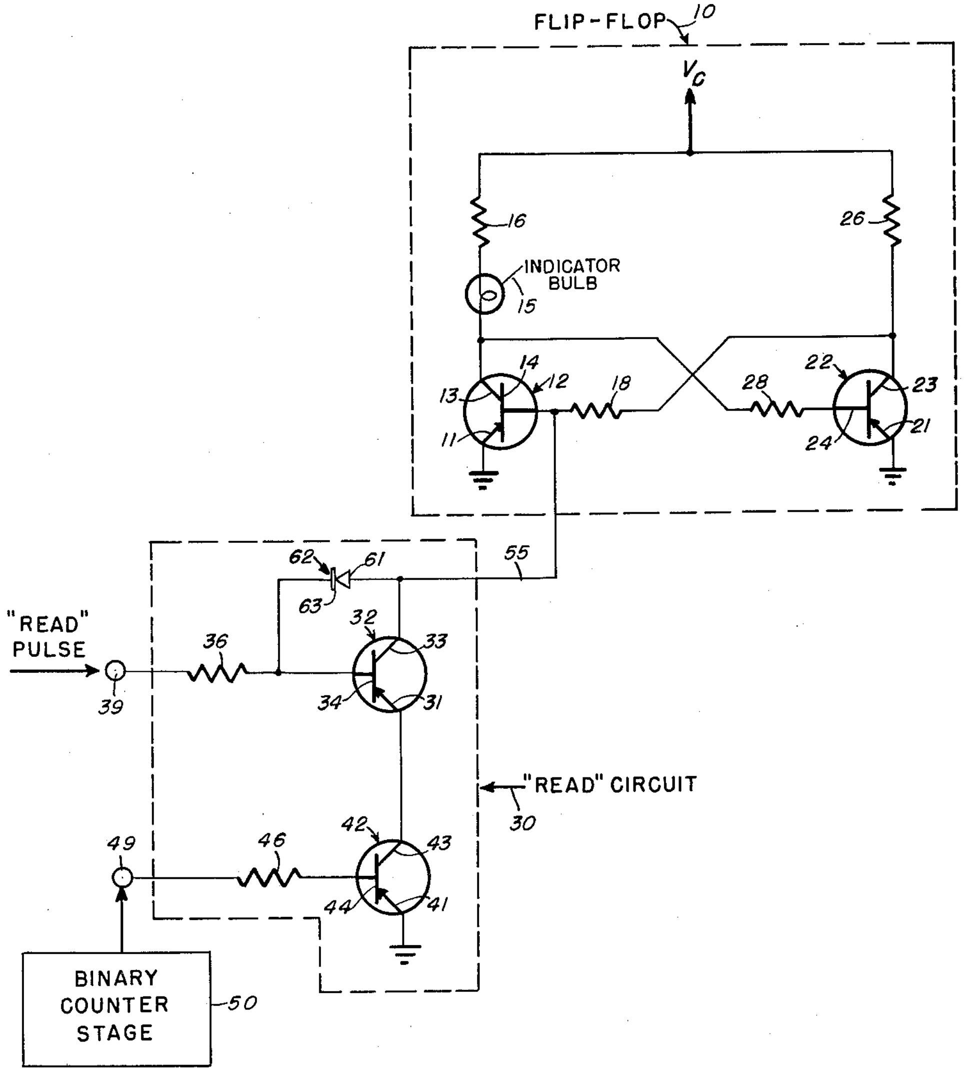
Inventor,
PHILIP EMILE, JR.
BY W. E. Thibodeau, A. T. Dupont, N. Cass & J. D. Edgerton United States Patent Office 3,020,418

Patented Feb. 6, 1962

3,020,418
TRANSISTORIZED STORAGE REGISTER-INDICATOR CIRCUIT

Philip Emile, Jr., Washington, D.C., assignor to the United States of America as represented by the Secretary of the Army Filed May 23, 1958, Ser. No. 737,462
4 Claims. (Cl. 307—88.5)
(Granted under Title 35, U.S. Code (1952), sec. 266)

The invention described herein may be manufactured and used by or for the Government for governmental purposes without the payment to me of any royalty thereon.

This invention relates to computer circuits in general and more particularly to a novel transistorized storage register-indicator circuit.

Although the novel circuit of this invention has many uses, its primary object is to provide a simple, non-critical transistorized storage register to indicate the "0" or "1" state of a binary counter stage upon the application of a "command transfer" or "read" pulse. The storage register is to then hold this indication, unaffected by the action of the binary counter stage, until the next "read" pulse. It is an additional object that the indicator be a low voltage light source. A further object is that the storage register-indicator circuit have no effect upon the binary counter at any time.

In a typical embodiment of the invention, the above objects are provided in a simple circuit employing four transistors, a semiconductor diode and a low voltage indicator bulb. Two of the transistors are connected as a flip-flop whose "0" or "1" state is indicated by the low voltage bulb in one of the collector leads. The other two transistors and the semiconductor diode are connected as a "read" circuit. The "read" circuit is connected to a binary counter stage which may also be in either a "0" or "1" state. The "read" circuit is adapted to trigger the flip-flop circuit to the same state (either "0" or "1") as the binary counter when a "read" pulse is applied to the "read" circuit.

The specific nature of the invention, as well as other objects, uses, and advantages thereof, will clearly appear from the following description and from the accompanying drawing, in which the drawing is a circuit diagram of a storage register-indicator in accordance with the invention.

As shown in the drawing the storage register-indicator circuit of this invention may be separated into two portions: a two-transistor flip-flop 10, and a "read" circuit 30. A binary counter stage 50 and a "read" pulse feed the "read" circuit 30.

The flip-flop 10 comprises two transistors 12 and 22 connected as a bistable flip-flop, each transistor being arranged for common emitter operation. The transistors 12 and 22 each have a collector, a base, and a grounded emitter designated as 13, 14, 11 and 23, 24, 21, respectively. In vacuum tube flip-flop indicator circuits, a low current neon bulb is ordinarily used as a light indicator to indicate the "0" or "1" state of the flip-flop. In transistor circuits however high voltages are not normally available. To overcome this problem the present invention utilizes the ability of a transistor to pass relatively high currents between its collector and emitter when the transistor is saturated. When saturated the impedance across the collector and emitter is very low so that even with relatively high currents passed therebetween, the power dissipated in the transistor will be quite small.

The flip-flop 10 shown in the drawing operates similarly to a conventional transistor flip-flop. The collector resistors 16 and 26 and the base resistors 18 and 28 are chosen in conjunction with the voltage source $V_c$ and the characteristics of the transistors 12 and 22 to provide flip-flop operation. That is, the circuit 10 is adjusted so that when one of the transistors is conducting the other transistor is cut-off. In addition, the circuit 10 is adjusted so that the transistor 12 is kept well into saturation when conducting so that there will be sufficient current to light the indicator bulb 15 which is in series with the collector resistor 16. The collector resistor 16 is preferably chosen relatively large compared to the resistance of the bulb 15 because the bulb resistance changes appreciably with heating and cooling of the bulb 15.

When the transistor 12 is conducting so that the bulb 15 is lit, the flip-flop 10 is designated as in the "1," or light on, state. When the transistor 22 is conducting and the transistor 12 is non-conducting so that the bulb 15 is unlit, the flip-flop 10 is designated as in the "0" or light off, state.

From the above description, the design of the flip-flop 10 in accordance with the invention may readily be provided by those skilled in the art. The fact that one of the transistors is saturated offers no problem in design, since the transistor current gain relationship follows into the saturation region. The transistor current gain relationship may be expressed as $I_c=\beta I_b$ where $I_c$ is the collector current, $I_b$ is the base current, and $\beta$ is the amplification factor in the common emitter connection. Since the $\beta$ of the transistor drops with increasing collector current, its value should be determined at the actual operating currents. In a specific embodiment of the flip-flop 10 using 2N77 transistors for the transistors 12 and 22 a collector voltage source $V_c$ of $-10$ volts, and a commercial 2 volt, 60 milliampere bulb 15, the following component values produced satisfactory operation: collector resistor 16, 130 ohms; collector resistor 26, 330 ohms; base resistor 18, 2,400 ohms; and base resistor 28, 10,000 ohms.

The "read" circuit 30 comprises two transistors 32 and 42 connected in series. The transistors 32 and 42 each have a collector, a base and an emitter designated as 33, 34, 31 and 43, 44, 41, respectively. The collector 33 of the transistor 32 is connected to the base 14 of the transistor 12; the emitter 31 of the transistor 32 is connected to the collector 43 of the transistor 42; and the emitter 41 of the transistor 42 is connected to circuit ground. The bases 34 and 44 of transistors 32 and 42 are connected to terminals 39 and 49 through base resistors 36 and 46, respectively.

A semiconductor diode 62 is connected between the collector 33 and base 34 of the transistor 32. The polarity of the diode 62 depends upon whether the transistors 12, 22, 32, and 42 are of the PNP or NPN type. In the drawing, the polarity of the diode 62 shown with its plate 61 connected to the collector 33 and its cathode 63 connected to the base 34 is for transistors 12, 22, 32, and 42 of the PNP type.

In the absence of a "read" pulse, the transistor 32 is adapted to be cut-off regardless of the state of the flip-flop 10 so that a high impedance as compared with the resistor 18 appears between the collector 33 and emitter 31. The diode 62 is also connected to present a high impedance. Thus, in the absence of a "read" pulse the impedance between the base 14 of the transistor 12 and circuit ground will be high as compared with the resistor 18 so that the flip-flop 10 will be unaffected by the "read" circuit 30 and may rest in either the "0" (light off) or "1" (light on) state as defined previously.

The state of the binary counter stage 50 is adapted to determine whether the transistor 42 is conducting or cut-off. When the binary counter stage 50 is in the "0" state, its output applied to the terminal 49 is preferably adjusted so that the transistor 42 will be saturated, a very low impedance thus appearing between the collector 43 and emitter 41. On the other hand, when the binary counter stage 50 is in the "1" state, its output applied to the terminal 49 is adjusted so that the transistor 42 is cut-off, a high impedance thus appearing between the collector 43 and emitter 41 of the transistor 42.

The "read" pulse applied to the terminal 39 and appearing at the base 34 is adapted to saturate the transistor 32 so that the impedance between the collector 33 and emitter 31 falls to a very low value. If the binary counter stage 50 is in the "1" state so that the transistor 42 is cut-off, the impedance between the base 14 and circuit ground will remain high because of the series connection of transistors 32 and 42.

The connection of the diode 62 is chosen so that the "read" pulse passes through the diode 62 and appears at the base 14 of the transistor 12. The flip-flop 10 may be resting in either the "1" (light on) or "0" (light off) state. If the flip-flop 10 happens to be in the "0" state where the transistor 12 is cut-off and the bulb 15 is unlit, the "read" pulse appearing at the base 14 is such as to turn the transistor 12 on so that the flipflop switches to the "1" (light on) state. If on the other hand, the flip-flop 10 happens to be in the "1" (light on) state where the transistor 12 is conducting, the "read" pulse appearing at the base 14 will not effect the transistor 12 and the flip-flop will remain in the "1" state.

If the binary counter stage 50 is in the "0" state so that the transistor 42 presents a very low impedance between its collector 43 and emitter 41, application of the "read" pulse to terminal 39 will then cause the impedance between the base 14 of the transistor 12 and circuit ground to fall to a very low impedance. This is because both series-connected transistors 32 and 42 now present a very low impedance across their collector and emitter. The resulting very low impedance appearing between the base 14 and circuit ground effectively drives the base 14 to ground. Since the forward resistance of a semiconductor diode such as diode 62 is about 200 ohms as compared with the short circuit impedance of each of the transistors 32 and 42 of about 2 ohms, practically no "read" pulse signal will reach the base 14. Thus, if the flip-flop 10 is initially in the "0" (light off) state where the transistor 12 is cut off, no "read" pulse will appear at the base 14 so that the transistor 12 will remain cut off and the flip-flop 10 will remain in the "0" (light off) state. If the flip-flop 10 is initially in the "1" (light on) state where the transistor 12 is conducting, the grounding of its base 14 will cut off the transistor 12 and the flip-flop will switch to the "0" (light off) state.

If the binary counter stage 50 is in the "1" state, the transistor 42 is rendered non-conducting and a high impedance is developed in the base circuit of transistor 12. Upon the application of a "read" pulse to the transistor 32, a pulse is applied to the base 14 of transistor 12 so as to render the transistor 12 conductive if it was previously non-conductive and to maintain it conductive if that was its previous state.

It is evident from the above that the flip-flop 10 will always end up in the same state as exists in the binary counter stage 50 after application of the "read" pulse, regardless of the initial state of the flip-flop 10.

In a specific embodiment of the "read" circuit 30 using 2N77 transistors for the transistors 32 and 42, the following component values produced satisfactory results: base resistor 36, 1,000 ohms; base resistor 46, 10,000 ohms; "read" pulse voltage, −3 volts; binary counter stage output when in "0" state −3 volts; and binary counter stage output when in "1" state, 0 volts. For the specific embodiment of the flip-flop 10 presented earlier, and the specific embodiment of the "read" circuit 30 above, "read" pulses of 50 microseconds duration were capable of transferring the state of the binary counter stage 50 to the light indicator bulb 15 of the flip-flop 10.

It is to be noted that the use of the diode 62 may not be necessary if the base resistor 36, the transistor 32 and the associated circuitry are properly chosen. This is because the base to collector diode of the transistor 32 is in the same direction as the diode 62 and may be used to perform the same function as the diode 62 under certain specialized conditions. For computer applications, however, such a circuit would be too critical and would require a more critical selection of circuit components. For this reason, the use of the diode 62 is ordinarily preferred in practical systems.

The storage register-indicator circuit of this invention may alternatively be used in a pulse pattern generator system. This could be done by attaching one multivibrator to the transistor 32 and another multivibrator to the transistor 42. This would then cause the circuit to generate at each collector of the flip-flop 10 a pattern described in "Probability and Information Theory," pp. 29–30, Pergamon Press, 1953, as the "Comb Function." By varying the relative frequencies of the multivibrators, various repetitive or non-repetitive pulse patterns may be generated. Other uses for the circuit of this invention will also be apparent to those skilled in the art.

It will be apparent that the embodiments shown are only exemplary and that various modifications can be made in construction and arrangement within the scope of the invention as defined in the appended claims.

I claim as my invention:

1. A storage register indicator circuit comprising a flip-flop circuit having first and second amplifying elements, said first amplifying element having a first electrode, said first electrode rendering said first amplifying element conductive upon the application of a pulse thereto and rendering said first amplifying element non-conductive upon being connected to a predetermined potential through a low impedance connection, third and fourth amplifying elements connected in series between said first electrode and said predetermined potential, means for rendering said fourth amplifying element highly conductive when said storage register is in one state and for rendering said fourth amplifying elements non-conductive when said storage register is in another state, means for applying a read" pulse to said third amplifying element, said third amplifying element being rendered conductive by said "read" pulse so that when said fourth amplifying element is conductive said first electrode is effectively connected to said predetermined potential and when said fourth amplifying element is non-conductive a pulse is applied to said first electrode.

2. A storage register-indicator circuit for indicating the state of a binary counter stage upon the application of a read pulse to said circuit, said circuit comprising a flip-flop having a first input terminal, said flip-flop assuming different states of conduction upon the application of signals of opposite polarity to said input terminal, a "read" circuit having a second input terminal and including first and second transistors connected in series circuit, said first transistor having an output electrode connected to said first input terminal, said second transistor having an input electrode, means connecting said input electrode to a counter stage such that said second transistor is in a low impedance condition when said counter is in a first state and is in a high impedance condition when said counter is in a second state, diode means connected between said second input terminal and said output electrode such that a "read" pulse is passed through said diode means when said second transistor is in a high impedance state, and means for rendering said first transistor conductive upon the application of said "read" pulse when said second transistor is in a low impedance state.

3. The combination according to claim 2 wherein said first transistor further comprises an input electrode, and wherein said diode means comprises a diode connected between said input and output electrodes of said first transistor.

4. The combination according to claim 3 wherein said input and output electrodes of said first transistor comprise base and collector electrodes respectively and said input electrode of said second transistor comprises a base electrode.

References Cited in the file of this patent

UNITED STATES PATENTS

| | | |
|---|---|---|
| 2,589,465 | Weiner | Mar. 18, 1952 |
| 2,644,897 | Lo | July 7, 1953 |
| 2,772,410 | Logue et al. | Nov. 27, 1956 |
| 2,776,420 | Woll | Jan. 1, 1957 |
| 2,831,987 | Jones | Apr. 22, 1958 |
| 2,848,653 | Hussey | Aug. 19, 1958 |

OTHER REFERENCES

"What's Inside Transact?" (Cavalieri, Jr.), Electronic Design, vol. 4, No. 13, pages 22–25, 1956.